(12) United States Patent
Minamino

(10) Patent No.: US 11,081,830 B2
(45) Date of Patent: Aug. 3, 2021

(54) SEAL PART AND CONNECTOR

(71) Applicant: Yazaki Corporation, Tokyo (JP)

(72) Inventor: Yuya Minamino, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/992,019

(22) Filed: Aug. 12, 2020

(65) Prior Publication Data

US 2021/0057845 A1 Feb. 25, 2021

(30) Foreign Application Priority Data

Aug. 20, 2019 (JP) .............................. JP2019-150412

(51) Int. Cl.
| | |
|---|---|
| *H01R 13/52* | (2006.01) |
| *H01R 13/42* | (2006.01) |
| *H01R 13/502* | (2006.01) |
| *H01R 13/629* | (2006.01) |
| *H01R 24/38* | (2011.01) |

(52) U.S. Cl.
CPC ......... *H01R 13/5205* (2013.01); *H01R 13/42* (2013.01); *H01R 13/502* (2013.01); *H01R 13/5219* (2013.01); *H01R 13/629* (2013.01); *H01R 24/38* (2013.01)

(58) Field of Classification Search
CPC ................ H01R 13/443; H01R 13/648; H01R 13/5205; H01R 13/6592; H01R 13/512; H01R 13/6581; H01R 4/183; H01R 9/03; H01R 9/0524; H01R 43/18; H01R 43/28
See application file for complete search history.

(56) References Cited

U.S. PATENT DOCUMENTS

| | | | | |
|---|---|---|---|---|
| 5,711,686 | A * | 1/1998 | O'Sullivan .......... | H01R 9/0512 439/607.41 |
| 7,727,021 | B2* | 6/2010 | Haruna .................. | H01R 9/037 439/607.5 |
| 8,056,867 | B2* | 11/2011 | Tan Chin Yaw ..... | H01R 13/621 248/51 |
| 10,027,054 | B2* | 7/2018 | Takeshita ............... | H01R 43/18 |
| 10,418,743 | B2* | 9/2019 | Mori .................... | H01R 13/562 |
| 2009/0258521 | A1* | 10/2009 | Ooki .................. | H01R 13/5216 439/275 |

(Continued)

FOREIGN PATENT DOCUMENTS

JP 2018-156723 A 10/2018

*Primary Examiner* — Abdullah A Riyami
*Assistant Examiner* — Nader J Alhawamdeh
(74) *Attorney, Agent, or Firm* — Kenealy Vaidya LLP

(57) ABSTRACT

A seal part includes an elastic body that is in close contact with outer peripheral surfaces of a plurality of wires and an inner peripheral surface of a wire accommodation portion, and a rigid body that has an outer peripheral surface disposed to face the inner peripheral surface of the wire accommodation portion. The rigid body has a plurality of wire through holes allowing wires to coaxially pass through respectively. The elastic body includes first seal portions that respectively correspond to the wire through holes, and that are in close contact with the outer peripheral surfaces of the wires passing through the wire through holes, and a second seal portion that is in close contact with the inner peripheral surface of the wire accommodation portion in the wire accommodation portion.

12 Claims, 17 Drawing Sheets

(56) References Cited

U.S. PATENT DOCUMENTS

| | | | |
|---|---|---|---|
| 2012/0322305 A1 | 12/2012 | Uchiyama | |
| 2015/0288101 A1* | 10/2015 | Matsunaga | H01R 13/4538 |
| | | | 439/378 |
| 2016/0036155 A1* | 2/2016 | Kataoka | H01R 13/521 |
| | | | 439/736 |
| 2016/0111809 A1* | 4/2016 | Kataoka | H01R 13/5205 |
| | | | 439/587 |
| 2016/0134049 A1* | 5/2016 | Kataoka | H01R 13/5205 |
| | | | 439/587 |
| 2017/0338587 A1* | 11/2017 | Takeshita | H01R 43/18 |
| 2018/0269624 A1* | 9/2018 | Iwabe | H01R 13/631 |
| 2019/0190192 A1* | 6/2019 | Mori | H01R 13/621 |
| 2019/0190211 A1* | 6/2019 | Yamanashi | H01R 13/502 |
| 2019/0363479 A1* | 11/2019 | Yamanashi | H01R 13/516 |

* cited by examiner

SEAL PART AND CONNECTOR

CROSS-REFERENCE TO RELATED APPLICATION(S)

The present application claims priority to and incorporates by reference the entire contents of Japanese Patent Application No. 2019-150412 filed in Japan on Aug. 20, 2019.

BACKGROUND OF THE INVENTION

1. Field of the Invention

The present invention relates to a seal part and a connector.

2. Description of the Related Art

Conventional connectors have been known that each include a plurality of wired terminals, and a housing accommodating the wired terminals and allowing wires of the wired terminals to be drawn out. In the conventional connector, the wires are respectively provided with seal parts (see Japanese Patent Application Laid-open No. 2018-156723). The seal parts are each formed into an annular shape or a circular cylindrical shape, which, on sides of inner peripheral surfaces, are respectively in close contact with outer peripheral surfaces of the wires, and which, on sides of outer peripheral surfaces, are respectively in close contact with an inner peripheral surface of the housing covering the wires, suppressing liquid (water, for example) proceeding along the outer peripheral surfaces of the wires or the inner peripheral surface of the housing from entering toward sides of terminal metal fittings. The conventional connector is provided with a holder part (e.g., rear holder) configured to suppress the seal parts from being shifted in position outwardly from the housing.

In the conventional connector, the seal parts are first attached to the wires in a manner respectively shifted in position in an axial direction on the wires. The wires are then accommodated in the housing together with the terminal metal fittings coupled to the terminals. The seal parts are finally respectively caused to slide on the wires and fully accommodated in the housing. In the conventional connector, such operations as described above are performed wire by wire. In the conventional connector, in order to allow the seal parts to fully exert their liquid leakage prevention performance, it is necessary that the seal parts be not shifted in position or twisted during accommodation operations of the seal parts. As described above, conventional seal parts and connectors somewhat need to be improved in terms of assembly operations.

SUMMARY OF THE INVENTION

An object of the present invention is to provide a seal part and a connector that can improve ease of assembly operations.

In order to achieve the above mentioned object, a seal part according to one aspect of the present invention includes an elastic body that is in close contact with outer peripheral surfaces of a plurality of wires arranged in parallel to each other, per each of the wires, and that is in close contact with an inner peripheral surface of a wire accommodation portion accommodating the wires and allowing the wires to be drawn out of an opening; and a rigid body that is higher in rigidity than the elastic body, the rigid body having an outer peripheral surface allowed to be disposed, in the wire accommodation portion, to face the inner peripheral surface of the wire accommodation portion at a gap, wherein the rigid body has a plurality of wire through holes allowing the wires to coaxially pass through respectively, and target-fitting portions disposed to face the opening in the wire accommodation portion, the target-fitting portions allowing fitting portions of a holder part accommodated in the wire accommodation portion at a position closer to the opening than the rigid body to fit in an axis direction of the wire through holes, the target-fitting portions are each formed into a recessed shape recessed in the axis direction in a case where the fitting portions are each formed into a projecting shape, whereas are each formed into a projecting shape projecting in the axis direction in a case where the fitting portions are each formed into a recessed shape, and the elastic body includes first seal portions respectively corresponding to the wire through holes, the first seal portions each having a cylindrical shape with respect to inner peripheral surfaces of the wire through holes, the first seal portions being in close contact with the outer peripheral surfaces of the wires passing through the wire through holes, and a second seal portion having a cylindrical shape with respect to the outer peripheral surface of the rigid body, the second seal portion being in close contact, in the wire accommodation portion, with the inner peripheral surface of the wire accommodation portion.

According to another aspect of the present invention, in the seal part, it is desirable that the target-fitting portions are provided between the wire through holes adjacent to each other. According to still another aspect of the present invention, in the seal part, it is desirable that the target-fitting portions are disposed between the wire through holes adjacent to each other, and, when viewed from a virtual line coupling axes of the wire through holes adjacent to each other, respectively closer to one side of the outer peripheral surface and another one side of the outer peripheral surface of the rigid body.

According to still another aspect of the present invention, in the seal part, it is desirable that the rigid body is formed into a shape having the two wire through holes formed into identical shapes, and where, when viewed from a center between the axes of the two wire through holes, an outer shape on a side of one of the two wire through holes and an outer shape on a side of another one of the two wire through holes are symmetrical to each other between the sides of the one of the two wire through holes and the other one of the two wire through holes, and the target-fitting portions are respectively provided on the outer wall faces in the axis direction of the rigid body.

In order to achieve the above mentioned object, a connector according to still another aspect of the present invention includes a wired terminal where a terminal metal fitting is coupled to a terminal of a wire; a housing accommodating a plurality of the wired terminals and allowing the wires of the wired terminals respectively to be drawn out; a seal part sealing gaps between outer peripheral surfaces of the wires and an inner peripheral surface of the housing; and a holder part holding the seal part, wherein the housing includes a wire accommodation portion accommodating the wires and allowing the wires to be drawn out of an opening, the seal part includes an elastic body that is in close contact with the outer peripheral surfaces of the wires arranged in parallel to each other, per each of the wires, and that is in close contact with an inner peripheral surface of the wire accommodation portion, and a rigid body that is higher in rigidity than the elastic body, the rigid body having an outer peripheral surface allowed to be disposed, in the wire accommodation portion, to face the inner peripheral surface of the wire accommodation portion at a gap, the rigid body has a plurality of wire through holes allowing the wires to coaxially pass through respectively, and target-fitting portions disposed to face the opening in the wire accommodation portion, the target-fitting portions allowing fitting portions of the holder part accommodated in the wire accommodation portion at a position closer to the opening than the rigid body to fit in an axis direction of the wire through holes, the target-fitting portions are each formed into a recessed shape recessed in the axis direction in a case where the fitting portions are each formed into a projecting shape, whereas are each formed into a projecting shape projecting in the axis direction in a case where the fitting portions are each formed into a recessed shape, and the elastic body includes first seal portions respectively corresponding to the wire through holes, the first seal portions each having a cylindrical shape with respect to inner peripheral surfaces of the wire through holes, the first seal portions being in close contact with the outer peripheral surfaces of the wires passing through the wire through holes, and a second seal portion having a cylindrical shape with respect to the outer peripheral surface of the rigid body, the second seal portion being in close contact, in the wire accommodation portion, with the inner peripheral surface of the wire accommodation portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a seal part and a connector according to the present invention will now be described in detail with reference to the accompanying drawings. However, the embodiment does not intend to limit the present invention.

Embodiment

An embodiment of a seal part and a connector according to the present invention will be described with reference to FIGS. 1 to 18. The seal part is described in the course of describing a configuration of the connector.

A reference number 1 in FIGS. 1 to 11 represents the connector according to the embodiment. A reference sign WH in FIGS. 1 to 11 represents wires attached to the connector according to the embodiment. The wires WH attached to the connector are in a state where terminals of wires We are attached to the connector 1. A reference number 10 in FIGS. 1 to 8, and 11 represents a seal part according to the embodiment.

The connector 1 according to the embodiment is inserted into and fitted to a counterpart connector (not illustrated), and therefore electrically coupled to the counterpart connector, whereas is removed from the counterpart connector to cancel the electrical coupling with the counterpart connector.

Figure 1:
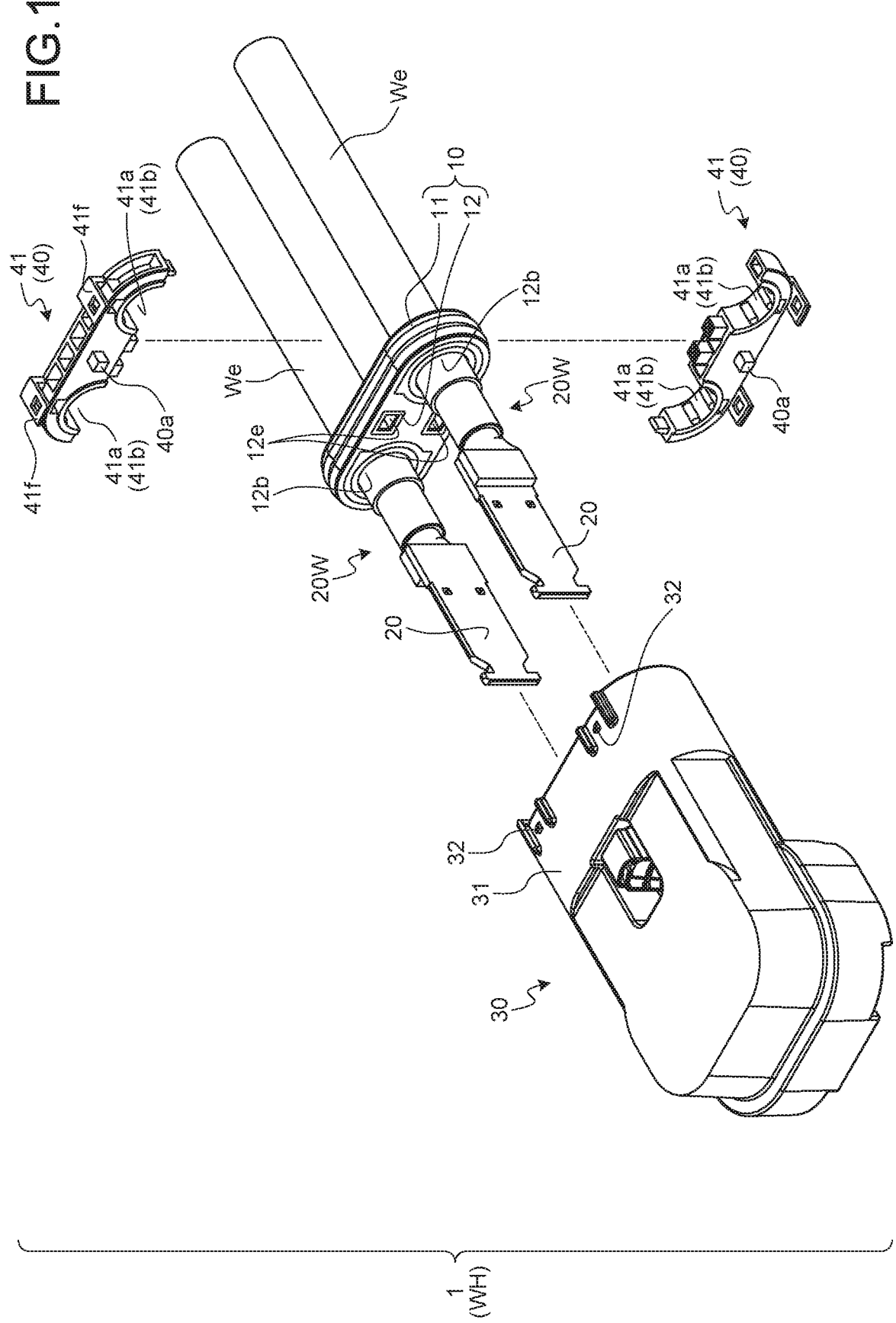
FIG. 1 is an exploded perspective view of a connector according to an embodiment, illustrating a seal part together with the connector.
Figure 2:
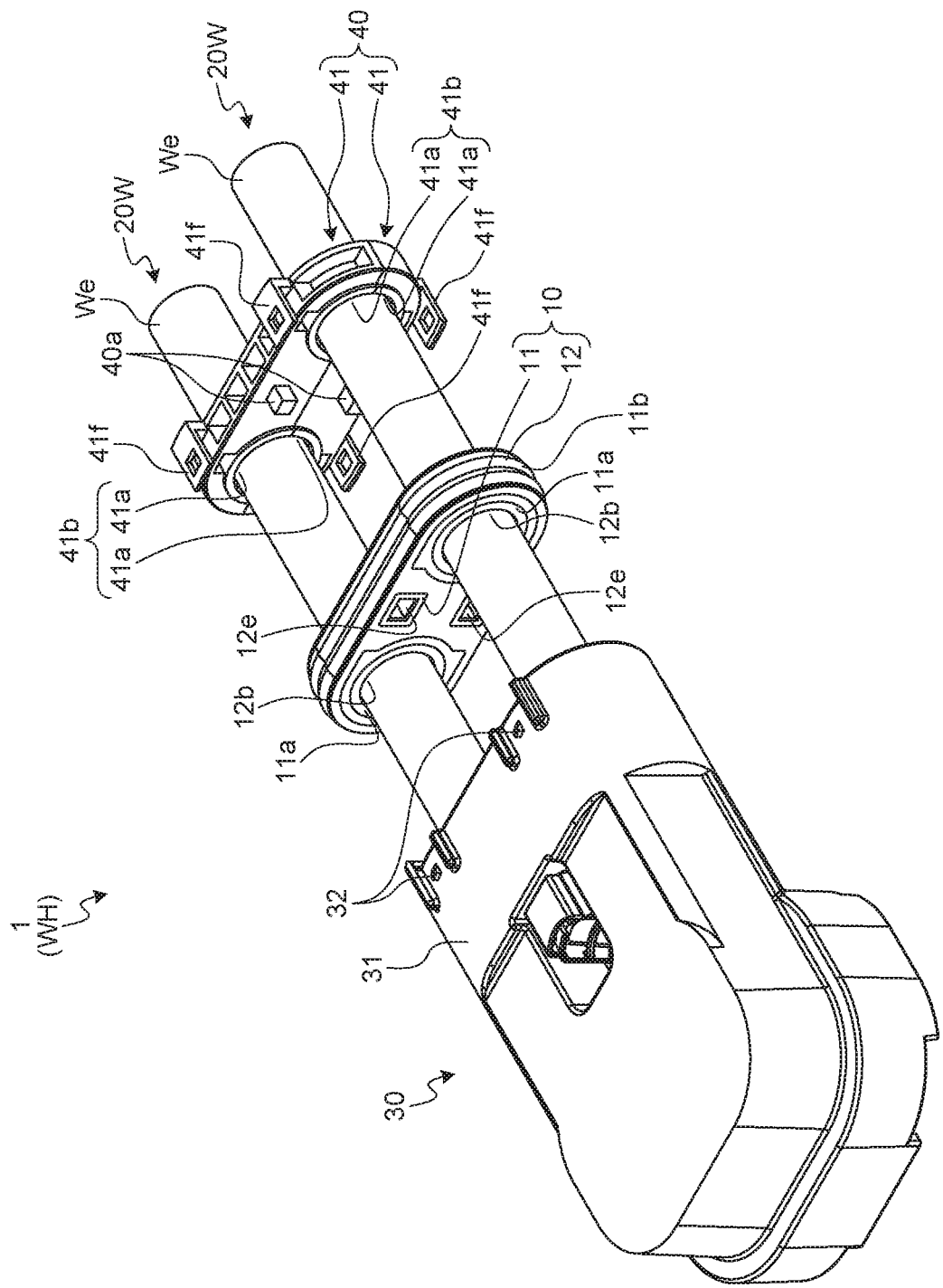
FIG. 2 is a perspective view illustrating the seal part and the connector according to the embodiment, representing a state after wires are accommodated.
Figure 3:
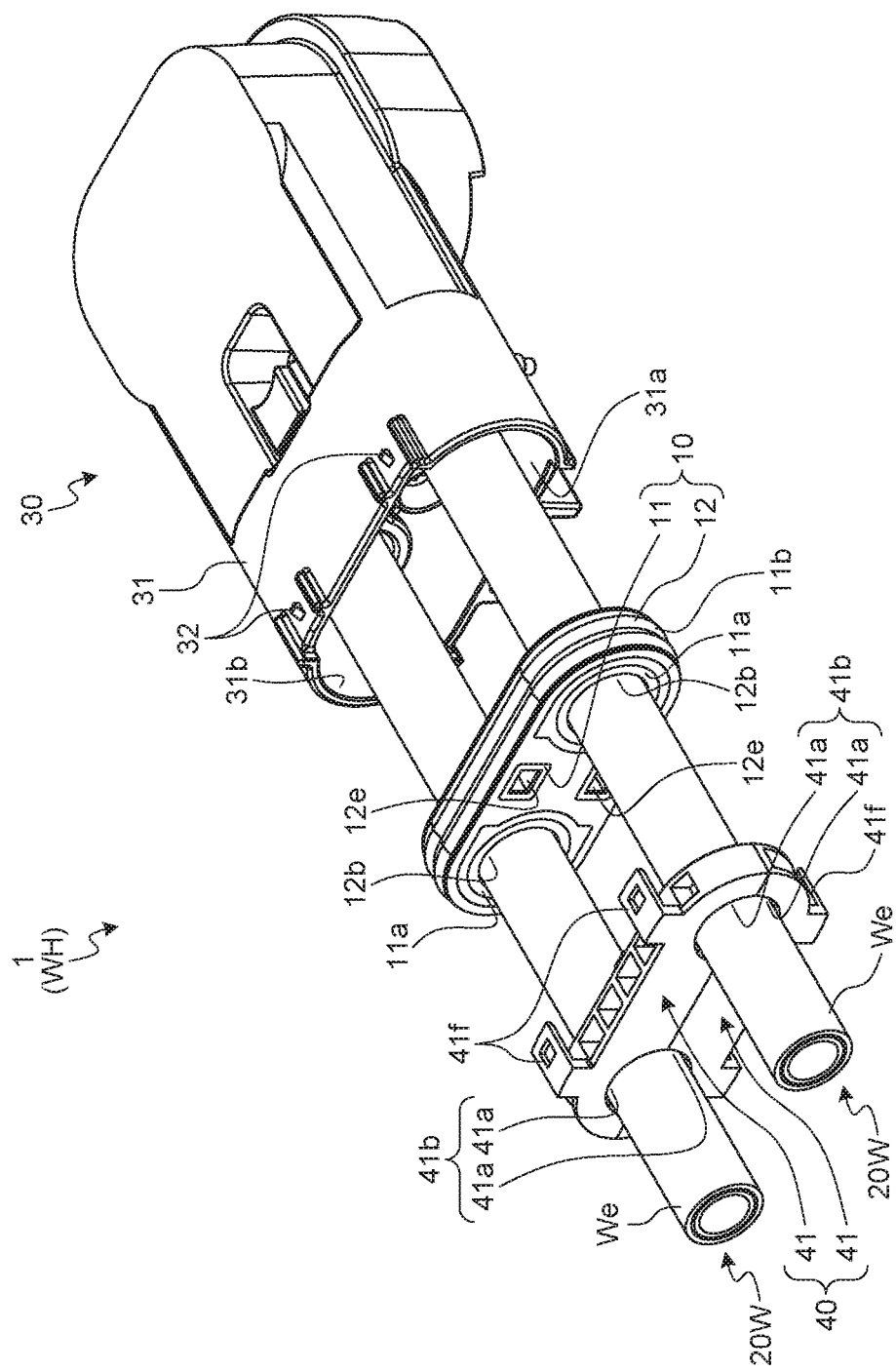
FIG. 3 is a perspective view, when viewed from another angle, of the seal part and the connector according to the embodiment, representing the state after the wires are accommodated.
Figure 4:
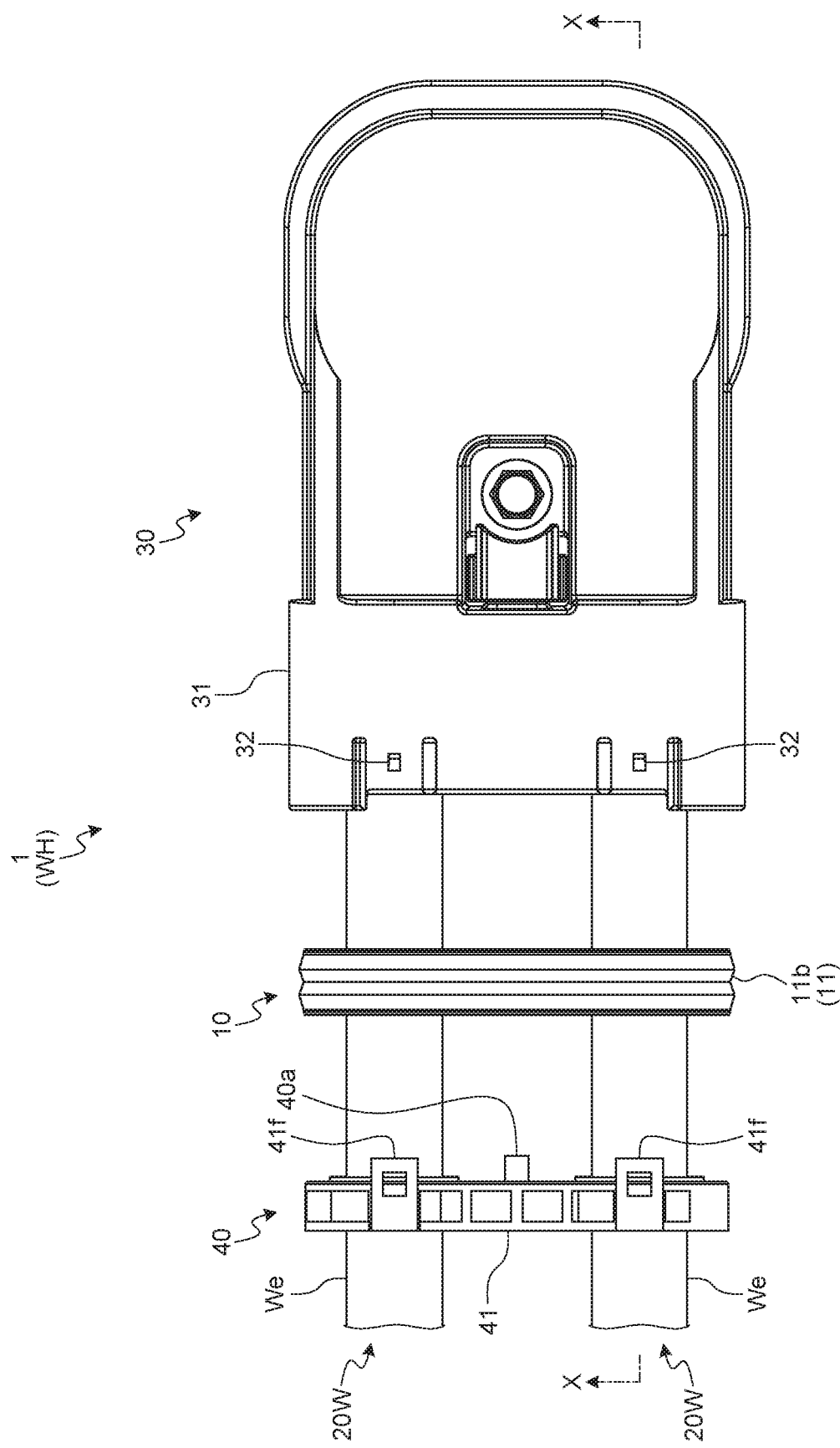
FIG. 4 is a plan view illustrating the seal part and the connector according to the embodiment, representing the state after the wires are accommodated.
Figure 5:
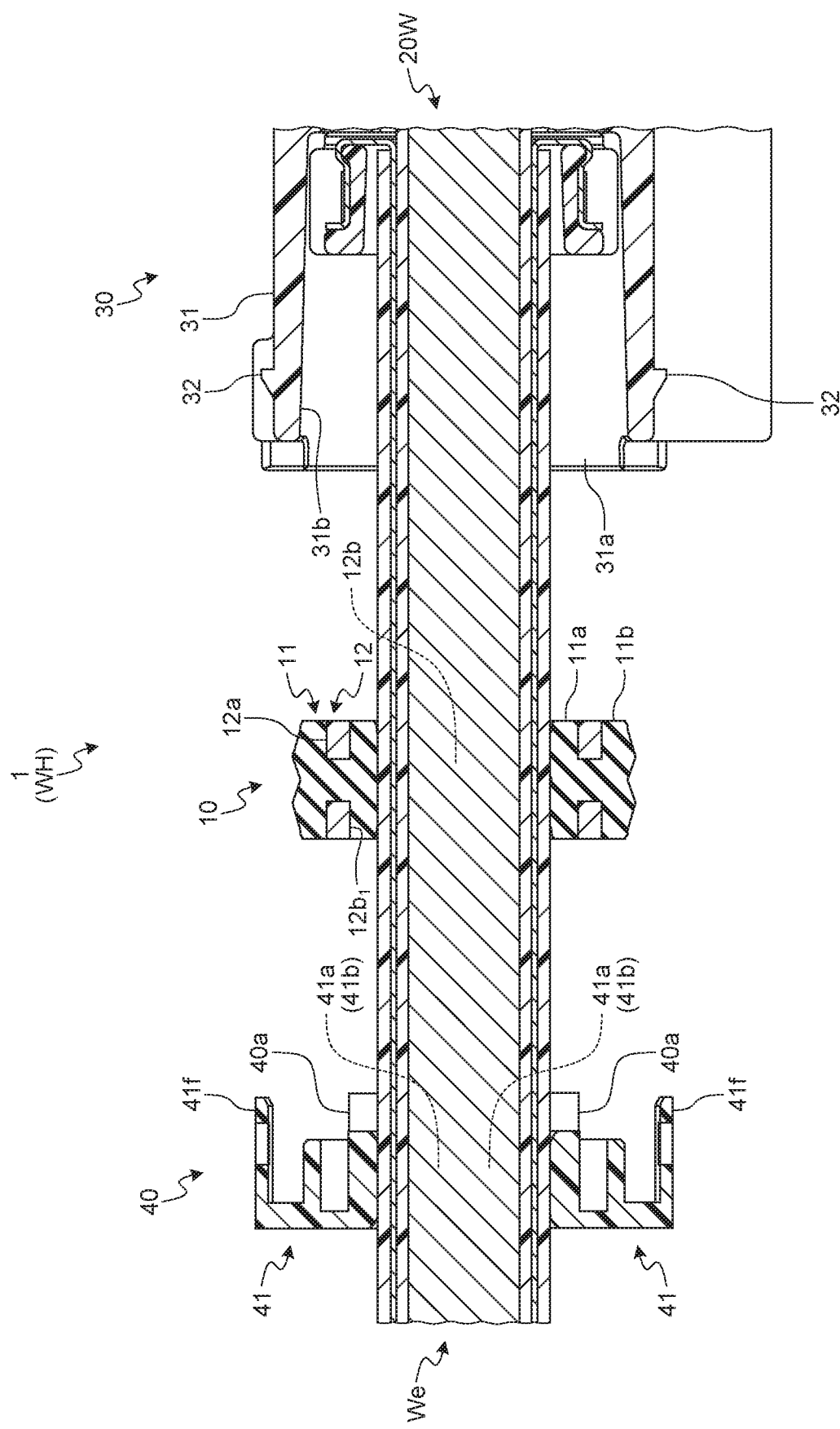
FIG. 5 is a cross-sectional view taken along a line X-X in FIG. 4, as well as is an excerpt view of the seal part and its peripheral parts, and of an installation location of the seal part.

The connector 1 according to the embodiment includes terminal metal fittings 20 having electrical conductivity (FIG. 1). The terminal metal fittings 20 are each formed into a predetermined shape and made of an electrical conductive material including metal (e.g., copper, copper alloy, aluminum, and aluminum alloy). The terminal metal fittings 20 may be each formed into a female terminal shape or a male terminal shape. Here, the terminal metal fittings 20 are physically and electrically coupled to the terminals of the wires We, respectively, to form wired terminals 20W. For example, the terminal metal fittings 20 may be press-fitted through clamping, for example, and electrically coupled, or may be secured through welding, for example, and electrically coupled to the terminals of the wires We. The connector 1 according to the embodiment includes a plurality of wired terminals 20W. The exemplified connector 1 is provided with two wired terminals 20W. The wires We illustrated here each have a circular cross section orthogonal to its axis direction.

The connector 1 according to the embodiment includes a housing 30 accommodating the wired terminals 20W (FIGS. 1 to 11). The housing 30 is made of an insulating material such as synthetic resin. The housing 30 accommodates the wired terminals 20W arranged in parallel to each other. The housing 30 allows the wires We of the accommodated wired terminals 20W respectively to be drawn out. The housing 30 includes a wire accommodation portion 31 accommodating the wires We and allowing the wires We to be drawn out of an opening 31$a$ (FIGS. 1 to 11). The wire accommodation portion 31 is formed into a cylindrical shape, and accommodates, in an inward space of its cylindrical portion, the wires We of the wired terminals 20W respectively in a parallel arrangement state. In the exemplified housing 30, the two wired terminals 20W are accommodated. The exemplified wire accommodation portion 31 is formed into an ellipsoidal cylindrical shape accommodating, in its longitudinal direction, the wires We of the two wired terminals 20W respectively and allowing the wires We respectively to be drawn out of the opening 31$a$ as they are in the parallel arrangement state.

The connector 1 according to the embodiment includes the seal part 10 sealing gaps between outer peripheral surfaces of the wires We and an inner peripheral surface of the housing 30, and a holder part (e.g., rear holder) 40 holding the seal part 10 (FIGS. 1 to 11). The seal part 10 is accommodated in the wire accommodation portion 31 to seal, in the wire accommodation portion 31, the gaps between the outer peripheral surfaces of the wires We and an inner peripheral surface of the wire accommodation portion 31. Thus, even if liquid such as water enters the wire accommodation portion 31 from the opening 31$a$, the liquid is suppressed from entering the seal part 10 and onward (i.e., toward a side of the terminal metal fittings 20). To suppress the seal part 10 accommodated at a designated position in the wire accommodation portion 31 from being shifted in position toward a side of the opening 31$a$, the holder part 40 is accommodated in the wire accommodation portion 31 at a position closer to the opening 31$a$ than the seal part 10 to hold the seal part 10 at the designated position in the wire accommodation portion 31. Therefore, the holder part 40 allows, in the wire accommodation portion 31, the seal part 10 to keep its liquid leakage prevention performance. For example, the housing 30 may be provided with a lock portion (not illustrated) configured to lock the seal part 10 on a side opposite to the holder part 40, and to pinch the seal part 10 together with the holder part 40.

The seal part 10 includes an elastic body 11 that is in close contact with the outer peripheral surfaces of the wires We arranged in parallel to each other, per each of the wires We, and that is in close contact with the inner peripheral surface of the wire accommodation portion 31, and a rigid body 12 that is higher in rigidity than the elastic body 11, and that has an outer peripheral surface 12$a$ allowed to be disposed, in the wire accommodation portion 31, to face an inner peripheral surface 31$b$ of the wire accommodation portion 31 at a gap (FIGS. 1 to 3, 5, 8, and 11 to 14). The elastic body 11 is made of an elastic material such as rubber. The rigid body 12 is formed to be higher in rigidity than the elastic body 11, as well as to have such hardness allowing a force received from the elastic body 11 to be returned to as is as a reactive force. The rigid body 12 is made of such a material (e.g., a synthetic resin material) that allows the rigid body 12 after formed to have such characteristics as described above. The seal part 10 is integrally formed through insert molding where, for example, an elastic material (an elastic material used to form the elastic body 11) is allowed to flow into a mold in which the rigid body 12 is accommodated.

The rigid body 12 is formed to have an external shape allowing the outer peripheral surface 12$a$ to be disposed at a substantially equal interval across a whole circumference of the inner peripheral surface 31$b$ of the wire accommodation portion 31. The rigid body 12 has a plurality of wire through holes 12$b$ allowing the wires We to coaxially pass through respectively (FIGS. 1 to 3, 5, 8, and 11 to 16).

Figure 12:
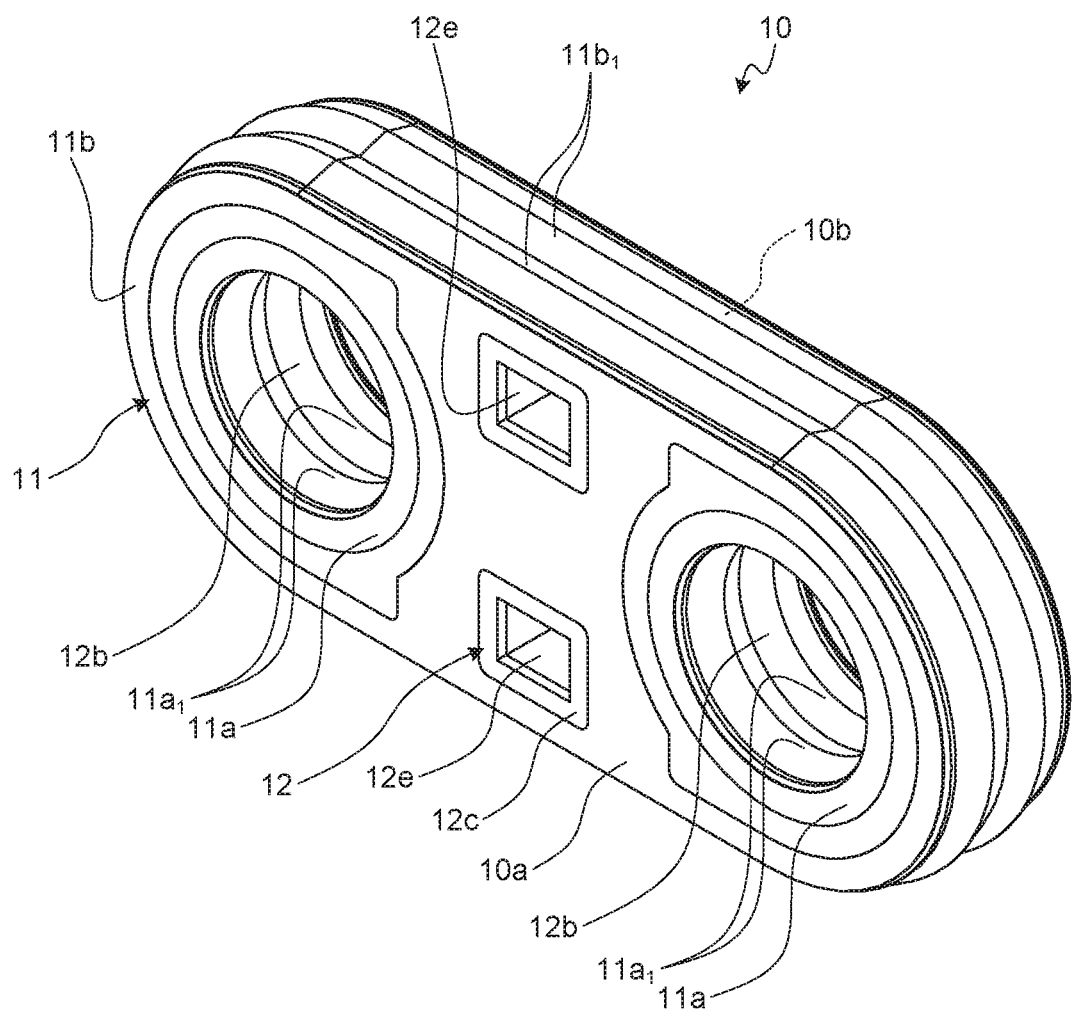
FIG. 12 is a perspective view illustrating the seal part.
Figure 13:
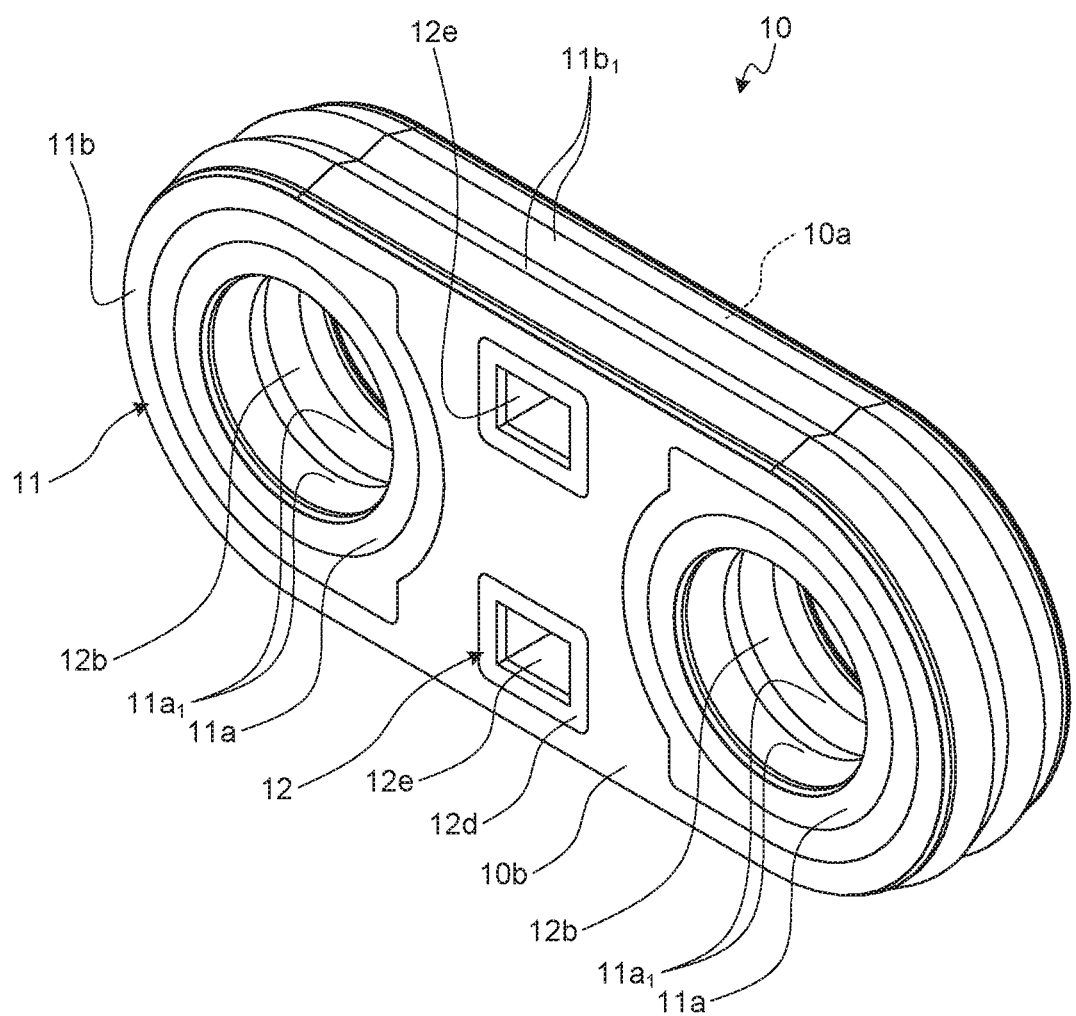
FIG. 13 is a perspective view of the seal part, when viewed from another angle.
Figure 14:
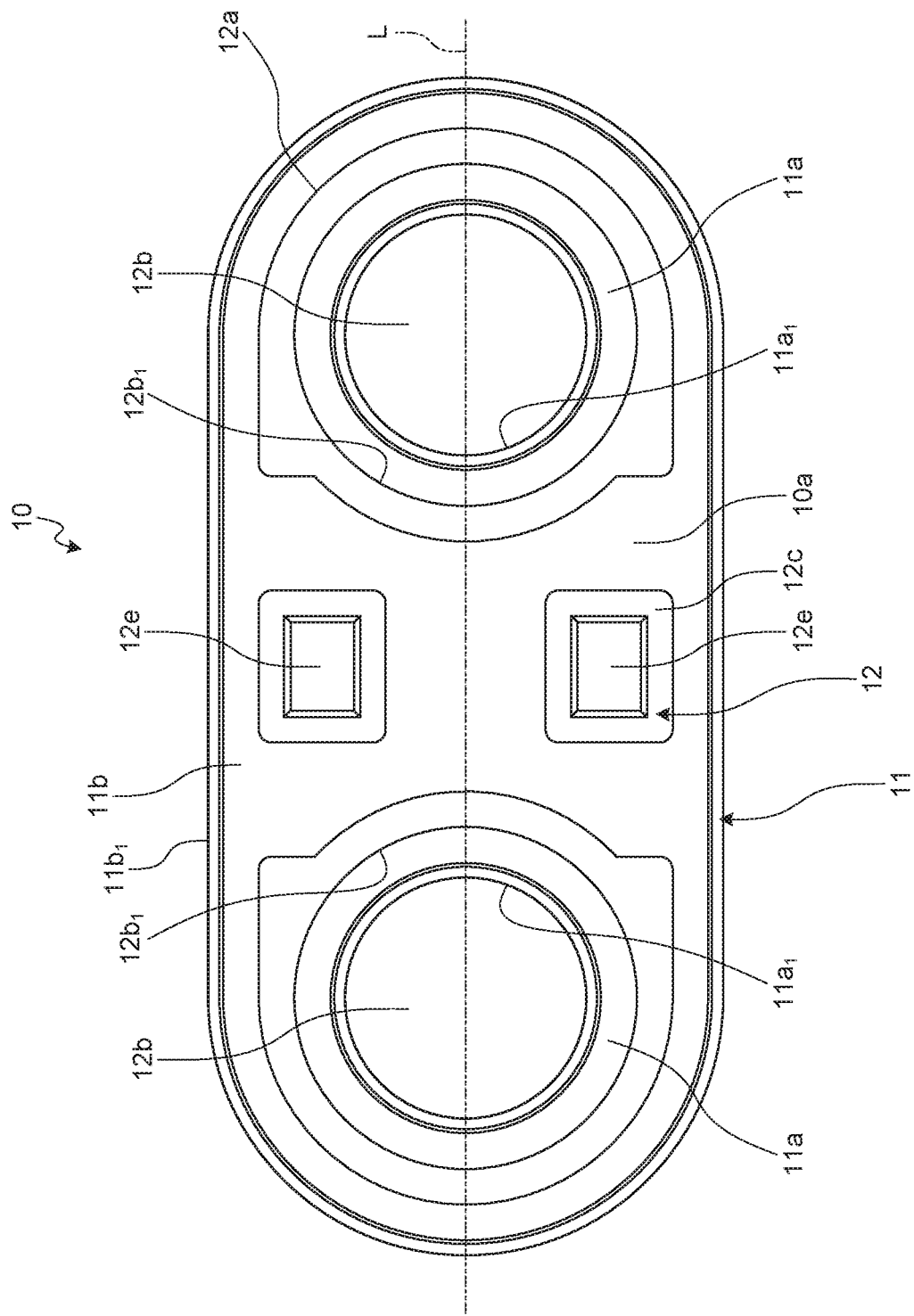
FIG. 14 is a plan view illustrating the seal part.

The elastic body 11 includes, respectively corresponding to the wire through holes 12$b$, first seal portions 11$a$ that each have a cylindrical shape with respect to inner peripheral surfaces 12$b_1$ of the wire through holes 12$b$, and that are respectively in close contact with the outer peripheral surfaces of the wires We passing through the wire through holes 12$b$ (FIGS. 12 to 14). Furthermore, the elastic body 11 includes a second seal portion 11$b$ that has a cylindrical shape with respect to the outer peripheral surface 12$a$ of the rigid body 12, and that is in close contact, in the wire accommodation portion 31, with the inner peripheral surface 31$b$ of the wire accommodation portion 31 (FIGS. 12 to 14). The first seal portions 11$a$ respectively include lips 11$a_1$ that each have an annular shape and that are respectively caused to warp themselves to be in close contact with the outer peripheral surfaces of the wires We (FIGS. 12 to 14). In each of the first seal portions 11$a$, a plurality of the lips 11$a_1$ are disposed in parallel to each other in a cylinder axial direction. The second seal portion 11$b$ includes lips 11$b_1$ that each have an annular shape and that are respectively caused to warp themselves to be in close contact with the inner peripheral surface 31$b$ of the wire accommodation portion 31 (FIGS. 12 to 14). In the second seal portion 11$b$, a plurality of the lips 11$b_1$ are disposed in parallel to each other in the cylinder axial direction.

Figure 15:
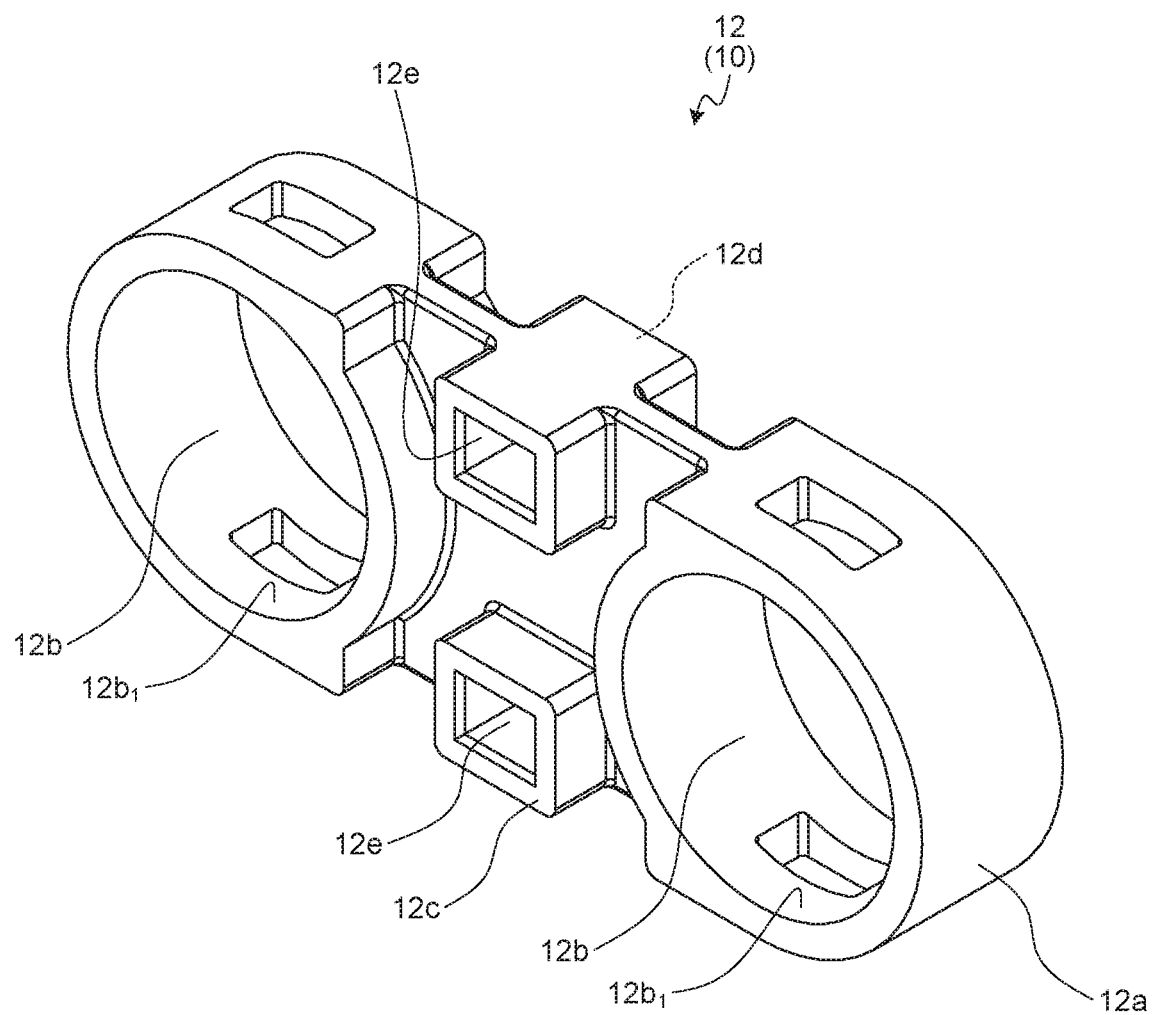
FIG. 15 is a perspective view illustrating a rigid body of the seal part.
Figure 16:
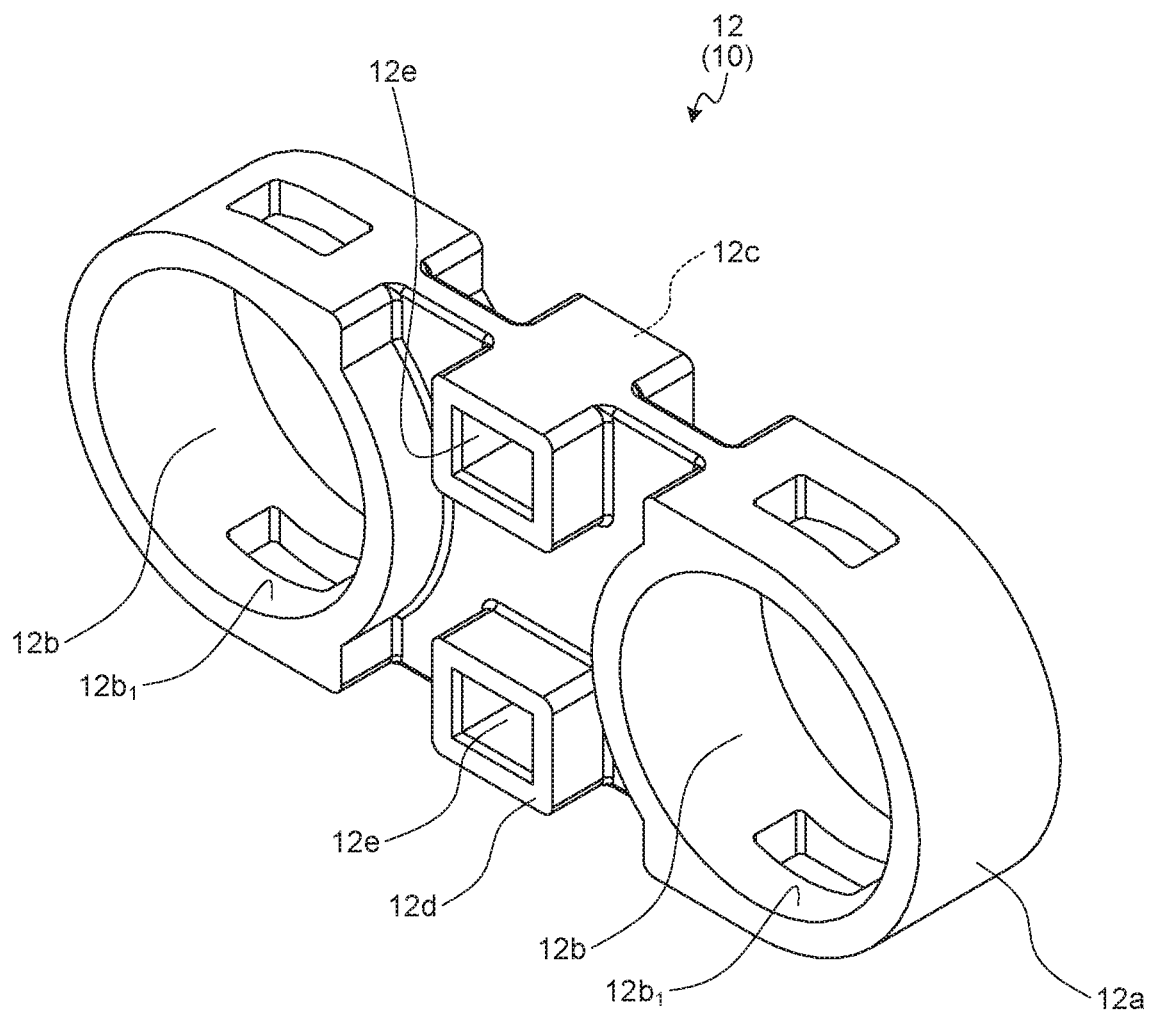
FIG. 16 is a perspective view of the rigid body of the seal part, when viewed from another angle.

For example, the rigid body 12 illustrated here is formed into a shape having the two wire through holes 12$b$ that are formed into identical shapes, and where, when viewed from a center between axes of the two wire through holes 12$b$, an outer shape on a side of one of the two wire through holes 12$b$ and an outer shape on a side of another one of the two wire through holes 12$b$ are symmetrical to each other between the sides of the one of the two wire through holes 12$b$ and the other one of the two wire through holes 12$b$. The exemplified rigid body 12 is formed into an ellipsoidal shape that is in conformity to a shape of the inner peripheral surface 31$b$ of the wire accommodation portion 31, as well as is formed into a plate shape having two kinds of outer wall faces 12$c$ and 12$d$ that are orthogonal to the axis direction of the wire through holes 12$b$ (FIGS. 15 and 16). However, to keep holding the integrally formed elastic body 11 in the rigid body 12, grooves and through holes into which the elastic body 11 is partially allowed to enter are provided at a plurality of locations as appropriate. In the exemplified rigid body 12, the two circular wire through holes 12$b$ are formed in parallel to each other in a longitudinal direction of the ellipsoidal shape. Therefore, the exemplified elastic body 11 is provided with the first seal portions 11$a$ each having a circular cylindrical shape, including the lips 11$a_1$ each having an annular shape, and the second seal portion 11$b$ having an ellipsoidal cylindrical shape, including the lips 11$b$ each having an ellipsoidal annular shape.

The exemplified seal part 10 has two outer wall faces 10$a$ and 10$b$ that are orthogonal to the axis direction of the wire through holes 12$b$ (FIGS. 12 and 13). The outer wall faces 10$a$ and 10$b$ are respectively formed by an outer wall face of the elastic body 11 and the outer wall faces 12c and 12d of the rigid body 12. The exemplified seal part 10 can be accommodated in the wire accommodation portion 31 in a state where one of the outer wall faces, that is, the outer wall face 10a, faces the opening 31a, or can be accommodated in the wire accommodation portion 31 in a state where another one of the outer wall faces, that is, the outer wall face 10b, faces the opening 31a.

As described above, the holder part 40 holds the seal part 10. Thus, the rigid body 12 is provided with target-fitting portions 12e that are disposed to face the opening 31a in the wire accommodation portion 31, and that are respectively fitted with fitting portions 40a of the holder part 40 in the axis direction of the wire through holes 12b (FIGS. 1 to 3, and 12 to 16). The target-fitting portions 12e are each formed into a recessed shape recessed in its axis direction in a case where the fitting portions 40a are each formed into a projecting shape, whereas are each formed into a projecting shape projecting in its axis direction in a case where the fitting portions 40a are each formed into a recessed shape. In this example, the target-fitting portions 12e are each formed into a recessed shape, whereas the fitting portions 40a are each formed into a projecting shape. The exemplified target-fitting portions 12e and the fitting portions 40a are each formed into a cube shape.

The target-fitting portions 12e are provided between the wire through holes 12b adjacent to each other (FIGS. 12 to 16). For example, the target-fitting portions 12e are disposed between the wire through holes 12b adjacent to each other, and, when viewed from a virtual line L coupling the axes of the wire through holes 12b adjacent to each other, respectively closer to one side of the outer peripheral surface 12a and another one side of the outer peripheral surface 12a of the rigid body 12 (FIG. 14). The exemplified target-fitting portions 12e are provided on the outer wall faces 12c and 12d of the rigid body 12, allowing, in the wire accommodation portion 31, desired one of the two outer wall faces 10a and 10b to face the opening 31a. Here, on the outer wall faces 12c and 12d, the two target-fitting portions 12e are formed closer to both sides of the outer peripheral surface 12a, when viewed from the virtual line L.

The holder part 40 is made of an insulating material such as synthetic resin. The holder part 40 may be a single member or a plurality of members integrally assembled to each other. The exemplified holder part 40 includes two holder members 41 having identical shapes (FIGS. 1 to 11, 17, and 18), which are integrally assembled to each other in a direction orthogonal to the axis direction of the wire through holes 12b (the axis direction of the wires We).

The holder members 41 respectively include recess portions (hereinafter referred to as "wire passing-through recess portions") 41a corresponding to the wire through holes 12b and allowing wires to pass through and respectively disposed to face the wire through holes 12b of the seal part 10 in the wire accommodation portion 31 (FIGS. 1 to 3, 5, 8, 11, 17, and 18). The exemplified wire passing-through recess portions 41a are each formed into a semicircle shape. In the holder part 40 where the holder members 41 are assembled to each other, corresponding pairs of wire passing-through recess portions 41a form circular through holes, and the through holes serve as wire through holes 41b allowing the wires We to pass through. In the holder part 40, the two wire through holes 41b are formed.

Figure 17:
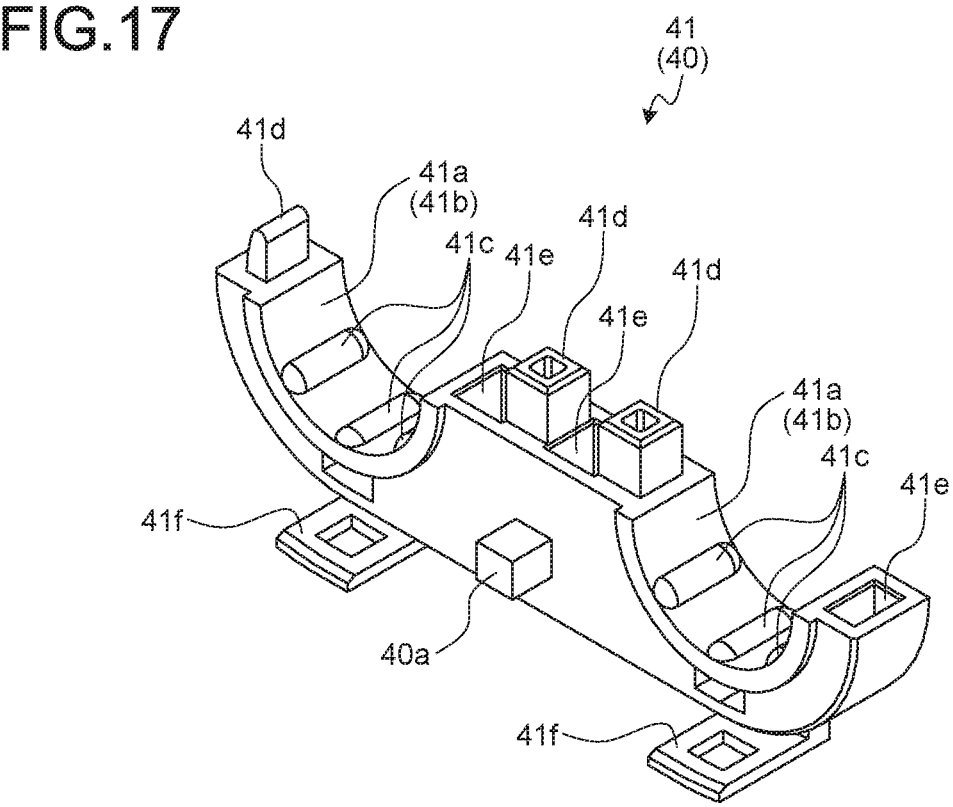
FIG. 17 is a perspective view illustrating a holder member of the holder part.
Figure 18:
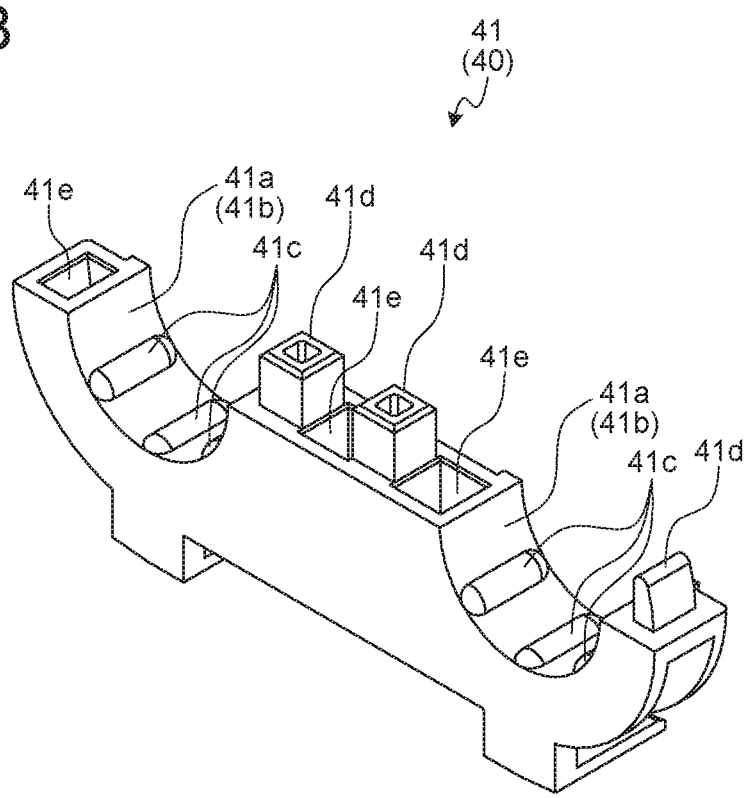
FIG. 18 is a perspective view of the holder member of the holder part, when viewed from another angle.

The holder members 41 are also utilized to hold the wires We respectively drawn out of the wire through holes 12b of the seal part 10 toward a side of the opening 31a. Thus, inner peripheral surfaces of the wire passing-through recess portions 41a are formed with a plurality of expanded portions 41c serving as holder portions expanded inwardly in a radial direction (FIGS. 17 and 18). The expanded portions 41c are in contact with the outer peripheral surfaces of the wires We passing through the wire through holes 41b to press and hold the wires We from sides of the outer peripheral surfaces.

The holder members 41 each include projecting portions 41d projecting in a direction of assembly with a counterpart holder member 41, and groove portions 41e into which the projecting portions 41d of the counterpart holder member 41 are fitted (FIGS. 17 and 18). The holder members 41 are integrated to each other by fitting the projecting portions 41d into the groove portions 41e of the counterpart holder member 41. Here, a plurality of combinations of the projecting portions 41d and the groove portions 41e respectively fitted to each other are provided.

The wire accommodation portion 31 holds the holder part 40. Thus, between the wire accommodation portion 31 and the holder part 40, such a holder mechanism is provided that includes holder portions 32 provided on the wire accommodation portion 31 and target-holder portions 41f respectively provided on the holder members 41 (FIGS. 1 to 11). In this example, where the holder portions 32 are respectively formed to serve as claw portions, whereas the target-holder portions 41f are respectively formed to serve as target-hooking portions that the holder portions 32 are to be hooked, the target-holder portions 41f that the holder portions 32 have been hooked suppress the holder part 40 from being removed from the opening 31a. Here, combinations of the holder portions 32 and the target-holder portions 41f forming as pairs are respectively provided at a plurality of locations.

Figure 6:
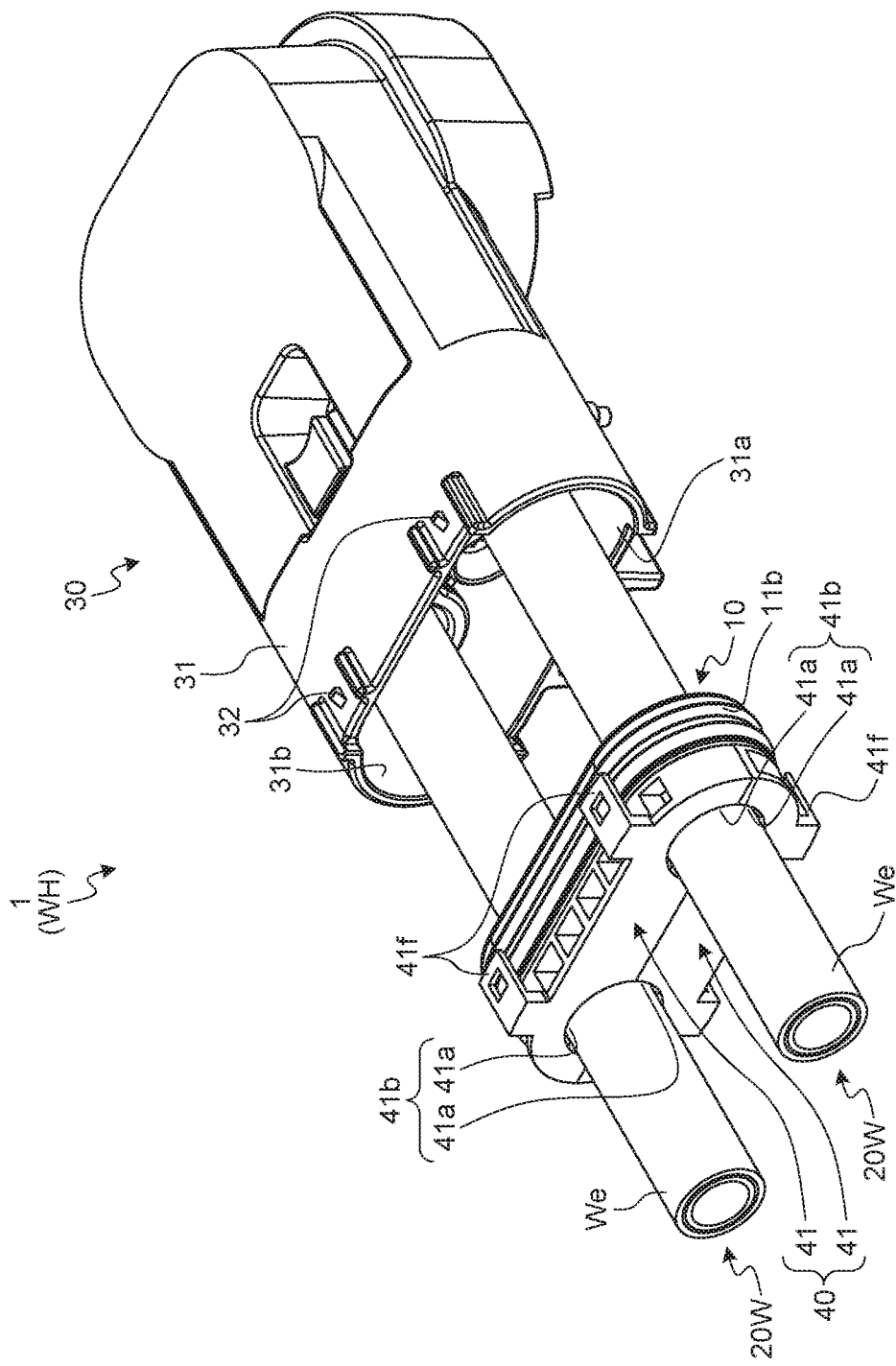
FIG. 6 is a perspective view illustrating the seal part and the connector according to the embodiment, representing a state after completion of assembly of the seal part and a holder part.
Figure 7:
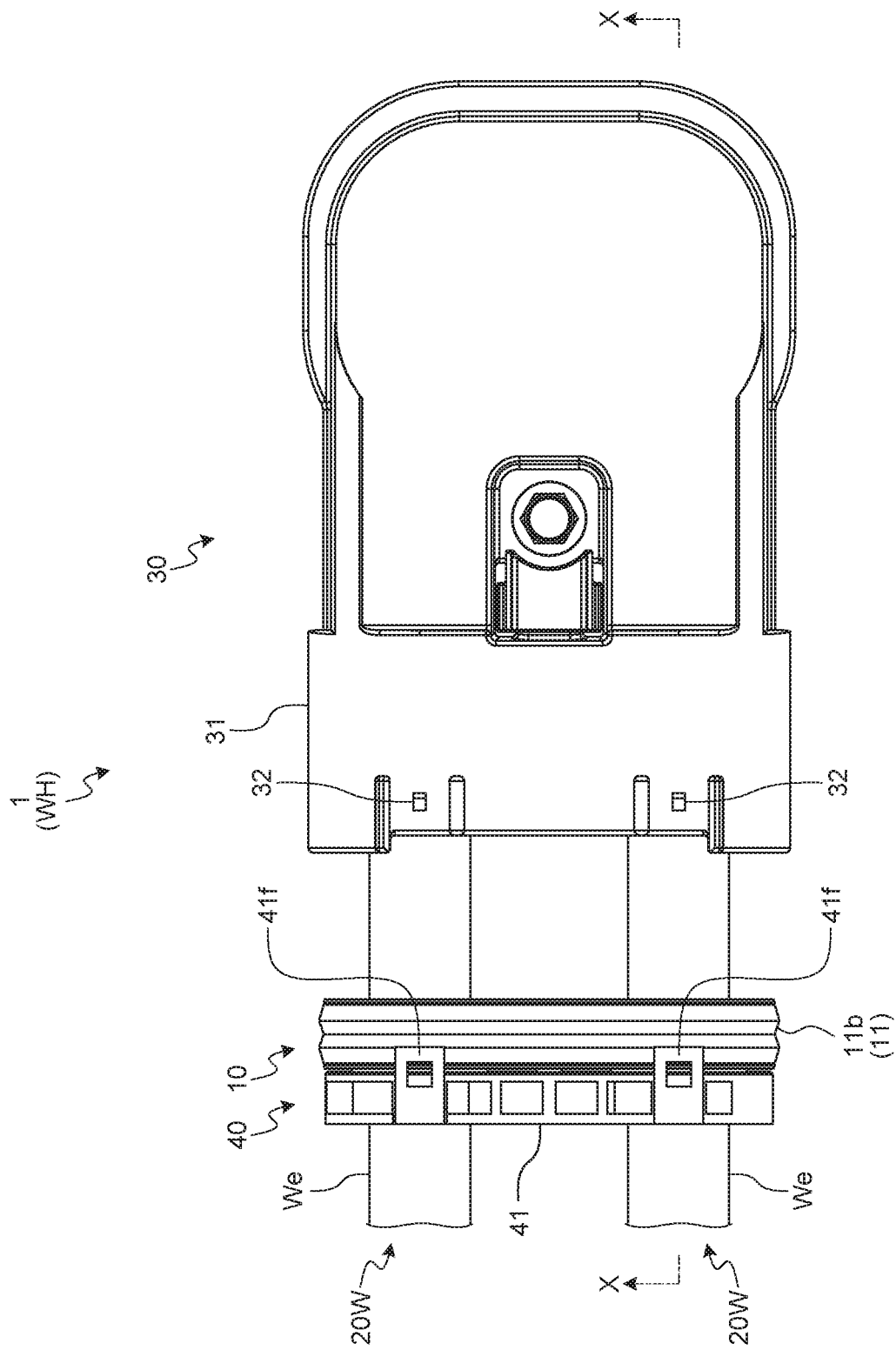
FIG. 7 is a plan view illustrating the seal part and the connector according to the embodiment, representing the state after completion of assembly of the seal part and the holder part.
Figure 8:
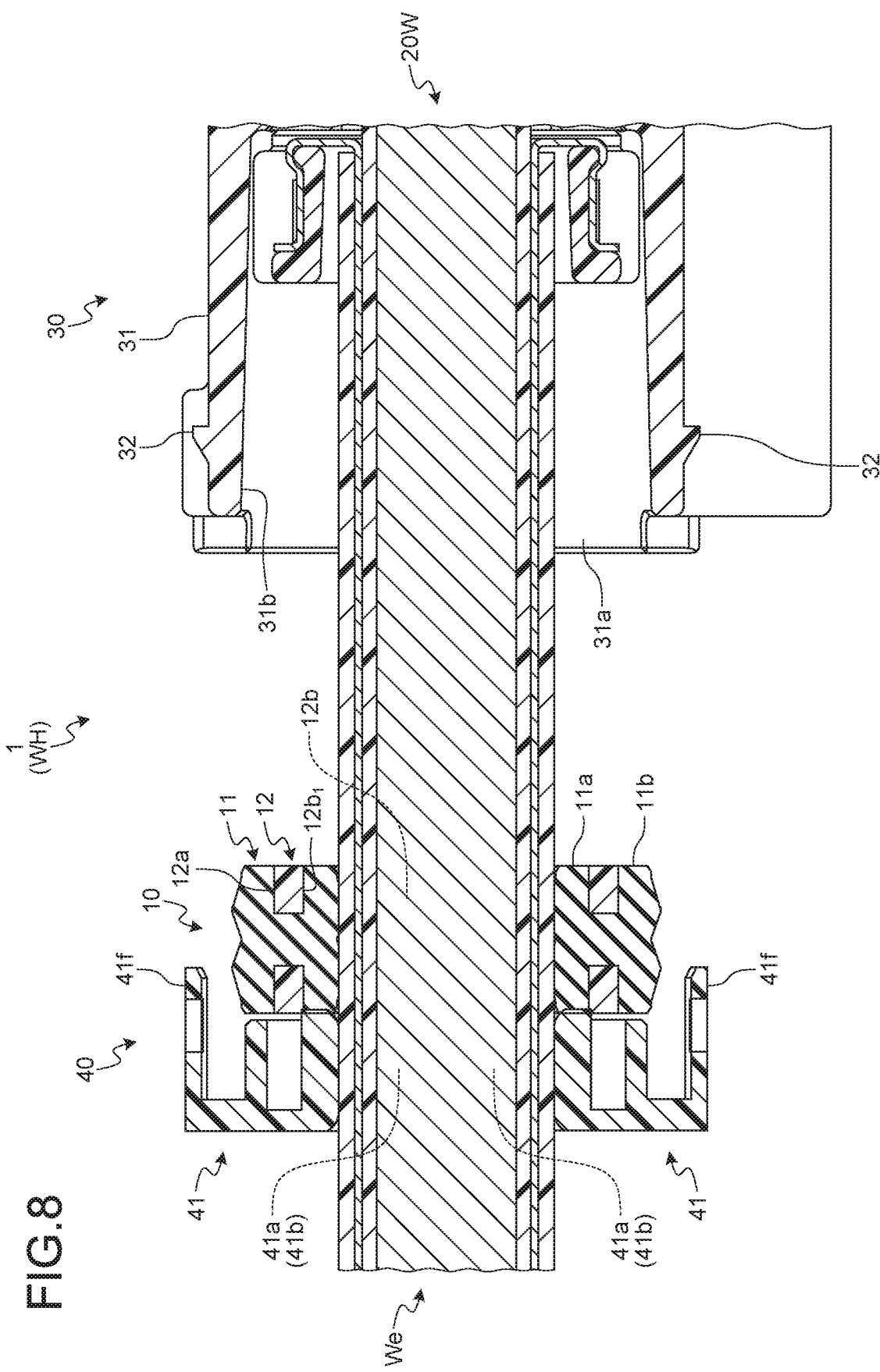
FIG. 8 is a cross-sectional view taken along a line X-X in FIG. 7, as well as is an excerpt view of the seal part and its peripheral parts, and of an installation location of the seal part.
Figure 9:
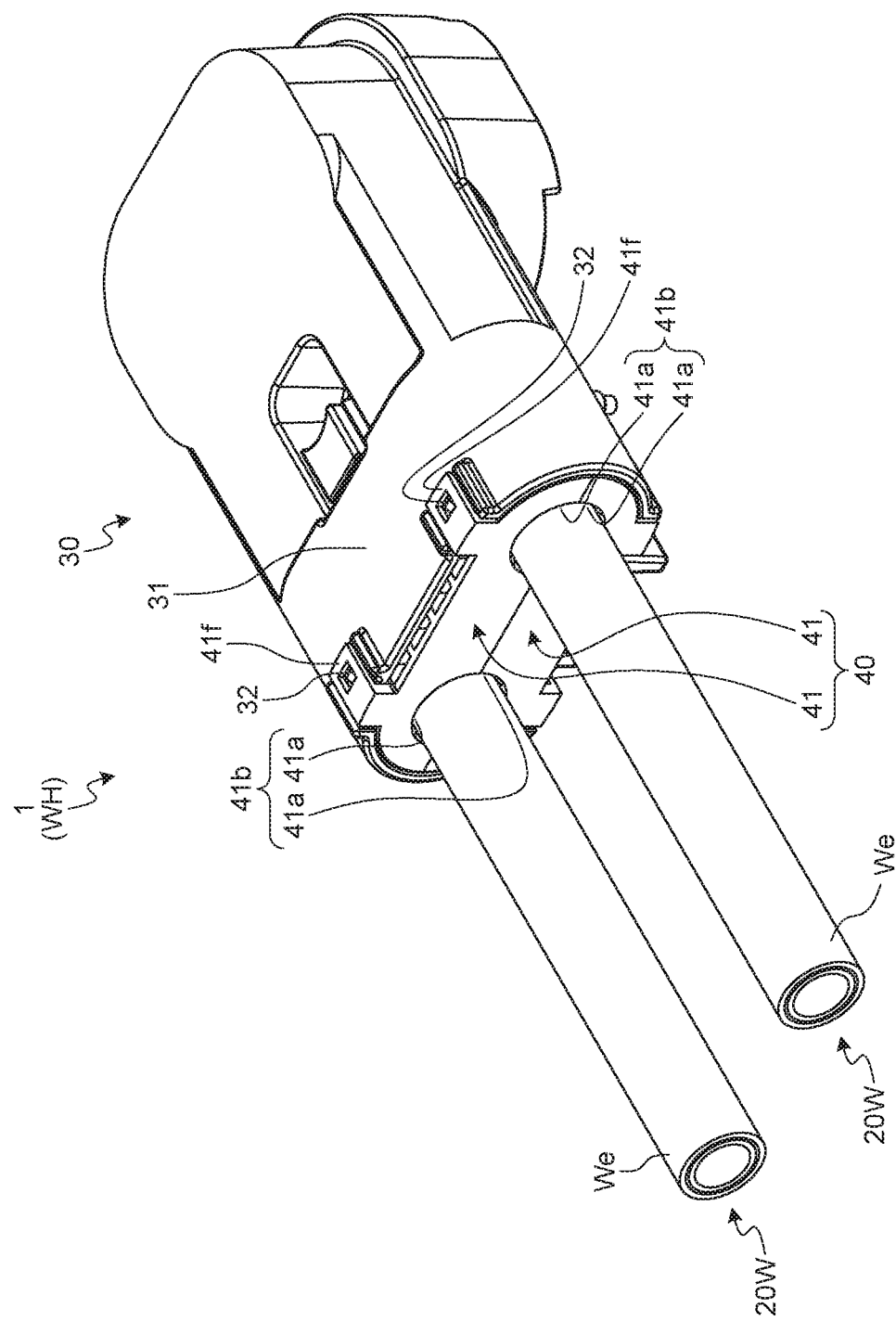
FIG. 9 is a perspective view illustrating a state after completion of assembly of the connector according to the embodiment.
Figure 10:
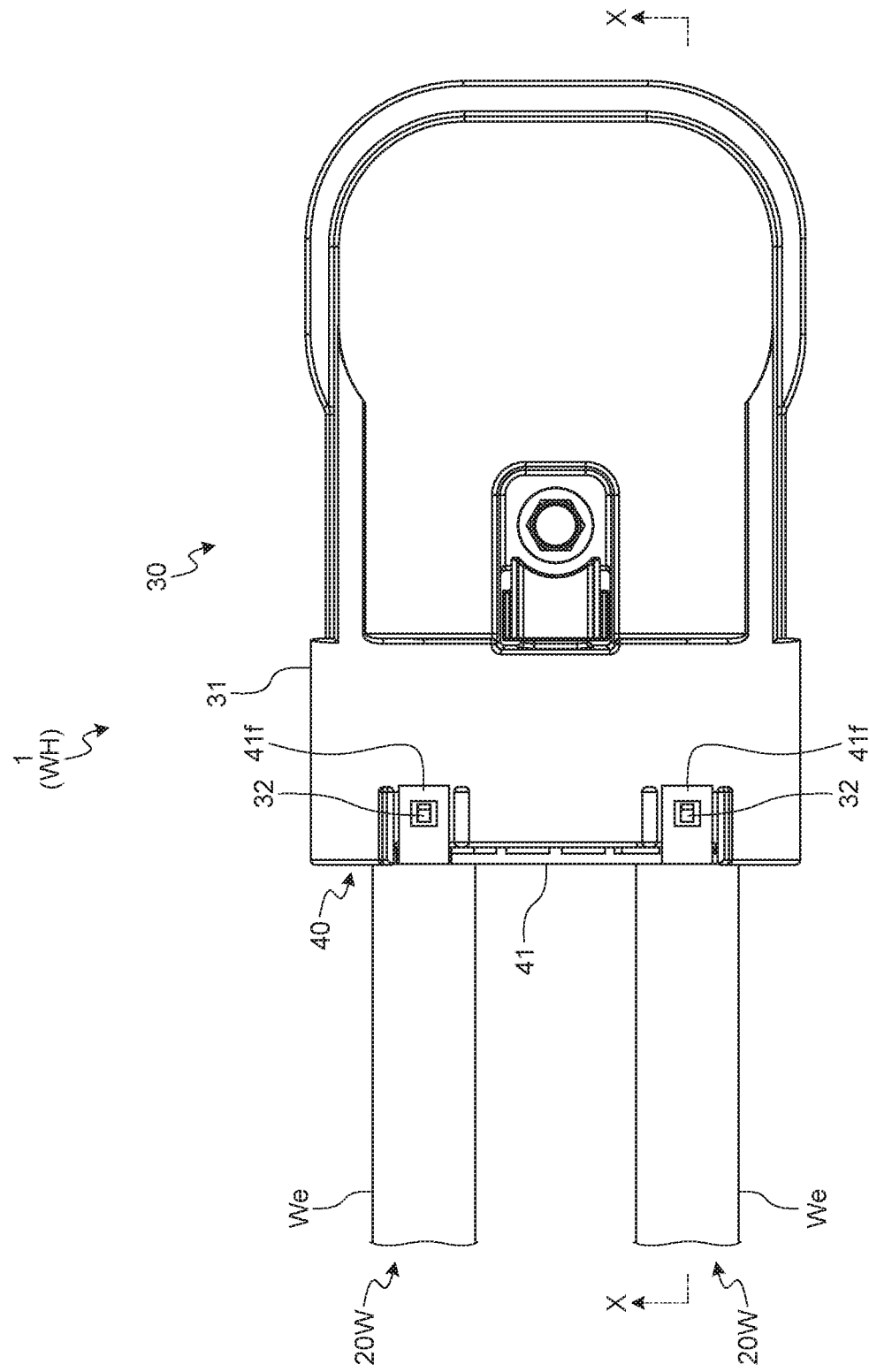
FIG. 10 is a plan view illustrating the state after completion of assembly of the connector according to the embodiment.
Figure 11:
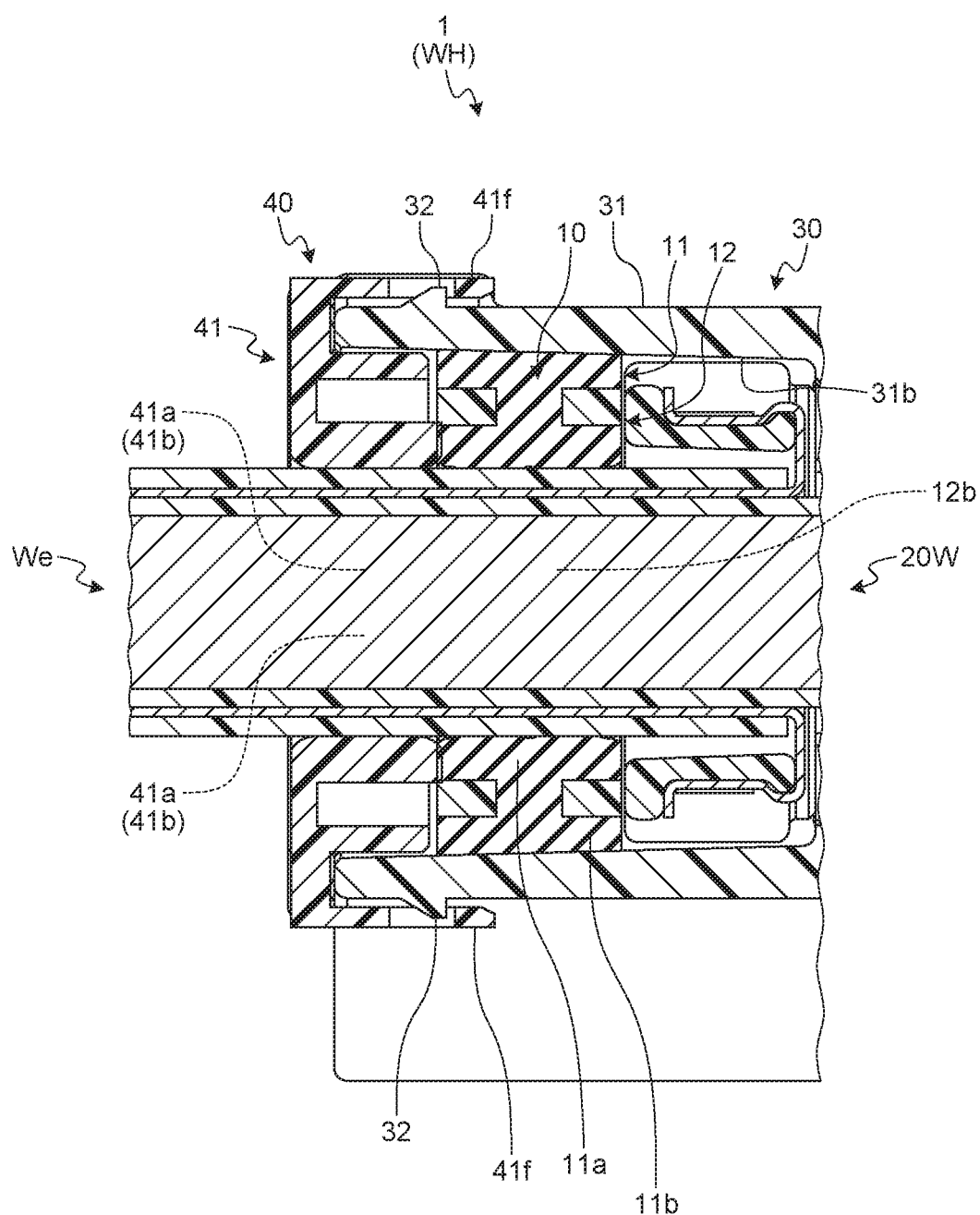
FIG. 11 is a cross-sectional view taken along a line X-X in FIG. 10, as well as is an excerpt view of the seal part and its peripheral parts.

In the connector 1 described above, for example, the wires We respectively pass through the wire through holes 12b of the seal part 10 to couple the terminals of the wires We and the terminal metal fittings 20 to each other, respectively. In the connector 1, where the wires We respectively pass through the wire through holes 12b, the two holder members 41 are assembled to pinch the wires We to assemble the wires We and the holder part 40 to each other (FIGS. 2 to 5). In the connector 1, one or both of the seal part 10 and the holder part 40 is or are shifted in position in the axis direction on the wires We to fit to each other the target-fitting portions 12e and the fitting portions 40a respectively to assemble the seal part 10 and the holder part 40 to each other (FIGS. 6 to 8). In the connector 1, the seal part 10 and the holder part 40 assembled to each other are shifted in position in the axis direction on the wires We to accommodate the seal part 10 and the holder part 40 assembled to each other, from the opening 31a, in the wire accommodation portion 31 to fix the holder part 40 to the wire accommodation portion 31 via the holder portions 32 and the target-holder portions 41f (FIGS. 9 to 11). At this time, the holder part 40 presses the seal part 10 to the designated position in the wire accommodation portion 31.

Here, after the terminal metal fittings 20 and the terminals of the wires We are coupled to each other, the wired terminals 20W may be accommodated, from the opening 31a, in the housing 30; after the wires We and the holder part 40 are assembled to each other, the wired terminals 20W may be accommodated, from the opening 31a, in the housing 30; or after the seal part 10 and the holder part 40 are assembled to each other, the wired terminals 20W may be accommodated, from the opening 31a, in the housing 30. In the connector 1, regardless of a timing of accommodating the wired terminals 20W in the housing 30, the seal part 10 and the holder part 40 are once kept placed outside the housing 30 before a step of accommodating the seal part 10 and the holder part 40 in the wire accommodation portion 31.

As described above, the seal part 10 according to the embodiment includes the wire through holes 12b and the first seal portions 11a respectively corresponding to the wires We, and the second seal portion 11b corresponding to the inner peripheral surface 31b of the wire accommodation portion 31. On the other hand, a conventional seal part has to be assembled per wire, and accommodated in a housing per wire. Therefore, the seal part 10 and the connector 1 according to the embodiment can improve ease of assembly operations, compared with conventional seal parts and connectors.

The seal part 10 according to the embodiment, where the rigid body 12 serving as a reinforcement member is provided, and the rigid body 12 is partially present between the first seal portions 11a adjacent to each other, can suppress deformations, other than warping of the lips $11a_1$ on the first seal portions 11a, as well as can suppress deformations, other than warping of the lips $11b_1$ on the second seal portion 11b. Therefore, in the seal part 10 according to the embodiment, where deformations such as twisting in components other than the lips $11a_1$ and $11b_1$ are suppressed during accommodation operations into the wire accommodation portion 31, it is not necessary to pay too much attention to occurrence of unnecessary deformations while accommodation operations take place. Therefore, the seal part 10 and the connector 1 according to the embodiment can improve, also in terms of the feature described above, ease of assembly operations, compared with conventional seal parts and connectors. Furthermore, in the seal part 10 according to the embodiment, where deformations during accommodation operations into the wire accommodation portion 31 are suppressed, it is also suppressed unnecessary deformations after completion of the accommodation operations. Therefore, the seal part 10 and the connector 1 according to the embodiment can also suppress the liquid leakage prevention performance from lowering.

The seal part 10 according to the embodiment, which can be accommodated in the wire accommodation portion 31, together with the holder part 40, by the target-fitting portions 12e and the fitting portions 40a, and can be pressed to the designated position in the wire accommodation portion 31 by the holder part 40, can be suppressed from being shifted in position in the axis direction with respect to the wire accommodation portion 31. Therefore, the seal part 10 and the connector 1 according to the embodiment can suppress, also in terms of the feature described above, the liquid leakage prevention performance from lowering. The target-fitting portions 12e and the fitting portions 40a forming pairs in this example are respectively disposed, as described above, closer to both sides of the outer peripheral surface 12a, when viewed from the virtual line L, between the wire through holes 12b adjacent to each other on the rigid body 12. Therefore, between the seal part 10 and the holder part 40, a force can be evenly exerted along an accommodation direction when the seal part 10 is to be accommodated in the wire accommodation portion 31. Accordingly, the exemplified seal part 10 can be further suppressed from being shifted in position in the axis direction with respect to the wire accommodation portion 31. Therefore, the seal part 10 and the connector 1 according to the embodiment can further suppress the liquid leakage prevention performance from lowering.

In the seal part 10 according to the embodiment, where unnecessary deformations other than warping of the lips $11a_1$ and $11b_1$ can be suppressed, as described above, deformations such as twisting and turning can also be suppressed, even though, after completion of accommodation of the seal part 10 in the wire accommodation portion 31, an external input is applied to the wires We lying outside of the housing 30, and the force is transmitted to the first seal portions 11a. Therefore, the seal part 10 and the connector 1 according to the embodiment can suppress the liquid leakage prevention performance of the connector after completion of assembly from lowering.

A seal part according to the present embodiment includes wire through holes and first seal portions respectively corresponding to wires, and a second seal portion corresponding to an inner peripheral surface of a wire accommodation portion. On the other hand, a conventional seal part has to be assembled per wire, and accommodated in a housing per wire. Therefore, the seal part and the connector according to the present embodiment can improve ease of assembly operations, compared with conventional seal parts and connectors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A sealing structure for a connector, comprising:
a housing accommodating a plurality of wired terminals and allowing wires of the wired terminals respectively to be drawn out;
a seal part sealing gaps between outer peripheral surfaces of the wires and an inner peripheral surface of the housing; and
a holder part holding the seal part, wherein
the housing includes a wire accommodation portion accommodating the wires and allowing the wires to be drawn out of an opening,
the seal part includes:
an elastic body that is in close contact with outer peripheral surfaces of a plurality of wires arranged in parallel to each other, per each of the wires, and that is in close contact with an inner peripheral surface of the wire accommodation portion; and
a rigid body that is higher in rigidity than the elastic body, the rigid body having an outer peripheral surface allowed to be disposed, in the wire accommodation portion, to face the inner peripheral surface of the wire accommodation portion at a gap,
the rigid body has
a plurality of wire through holes allowing the wires to coaxially pass through respectively, and
target-fitting portions disposed to face the opening in the wire accommodation portion, the target-fitting portions allowing fitting portions of the holder part accommodated in the wire accommodation portion at a position closer to the opening than the rigid body to fit in an axis direction of the wire through holes,
the target-fitting portions are each formed into a recessed shape recessed in the axis direction of the wire through holes in a case where the fitting portions are each formed into a projecting shape, whereas are each formed into a projecting shape projecting in the axis direction of the wire through holes in a case where the fitting portions are each formed into a recessed shape, and the elastic body includes
first seal portions respectively corresponding to the wire through holes, the first seal portions each having a cylindrical shape with respect to inner peripheral surfaces of the wire through holes, the first seal portions being in close contact with the outer peripheral surfaces of the wires passing through the wire through holes, and
a second seal portion having a cylindrical shape with respect to the outer peripheral surface of the rigid body, the second seal portion being in close contact, in the wire accommodation portion, with the inner peripheral surface of the wire accommodation portion.

2. The sealing structure for a connector according to claim 1,
wherein
the target-fitting portions are provided between the wire through holes adjacent to each other.

3. The sealing structure for a connector according to claim 1,
wherein
the target-fitting portions are disposed between the wire through holes adjacent to each other, and, when viewed from a virtual line coupling axes of the wire through holes adjacent to each other, respectively closer to one side of the outer peripheral surface and another one side of the outer peripheral surface of the rigid body.

4. The sealing structure for a connector according to claim 1,
wherein
the rigid body is formed into a shape having two wire through holes formed into identical shapes, and where, when viewed from a center between the axes of the two wire through holes, an outer shape on a side of one of the two wire through holes and an outer shape on a side of another one of the two wire through holes are symmetrical to each other between the sides of the one of the two wire through holes and the other one of the two wire through holes, and
the target-fitting portions are respectively provided on outer wall faces in the axis direction of the rigid body.

5. The sealing structure for a connector according to claim 2,
wherein
the rigid body is formed into a shape having two wire through holes formed into identical shapes, and where, when viewed from a center between the axes of the two wire through holes, an outer shape on a side of one of the two wire through holes and an outer shape on a side of another one of the two wire through holes are symmetrical to each other between the sides of the one of the two wire through holes and the other one of the two wire through holes, and
the target-fitting portions are respectively provided on outer wall faces in the axis direction of the rigid body.

6. The sealing structure for a connector according to claim 3,
wherein
the rigid body is formed into a shape having two wire through holes formed into identical shapes, and where, when viewed from a center between the axes of the two wire through holes, an outer shape on a side of one of the two wire through holes and an outer shape on a side of another one of the two wire through holes are symmetrical to each other between the sides of the one of the two wire through holes and the other one of the two wire through holes, and
the target-fitting portions are respectively provided on outer wall faces in the axis direction of the rigid body.

7. A connector comprising:
a wired terminal where a terminal metal fitting is coupled to a terminal of a wire; and the sealing structure according to claim 1.

8. A connector comprising:
a wired terminal where a terminal metal fitting is coupled to a terminal of a wire; and
the sealing structure according to claim 2.

9. A connector comprising:
a wired terminal where a terminal metal fitting is coupled to a terminal of a wire; and
the sealing structure according to claim 3.

10. A connector comprising:
a wired terminal where a terminal metal fitting is coupled to a terminal of a wire; and
the sealing structure according to claim 4.

11. A connector comprising:
a wired terminal where a terminal metal fitting is coupled to a terminal of a wire; and
the sealing structure according to claim 5.

12. A connector comprising:
a wired terminal where a terminal metal fitting is coupled to a terminal of a wire; and
the sealing structure according to claim 6.

* * * * *